Jan. 8, 1924.
F. O. NORRIS
1,480,293
ROLLER BEARING
Filed Feb. 16, 1922      2 Sheets-Sheet 1
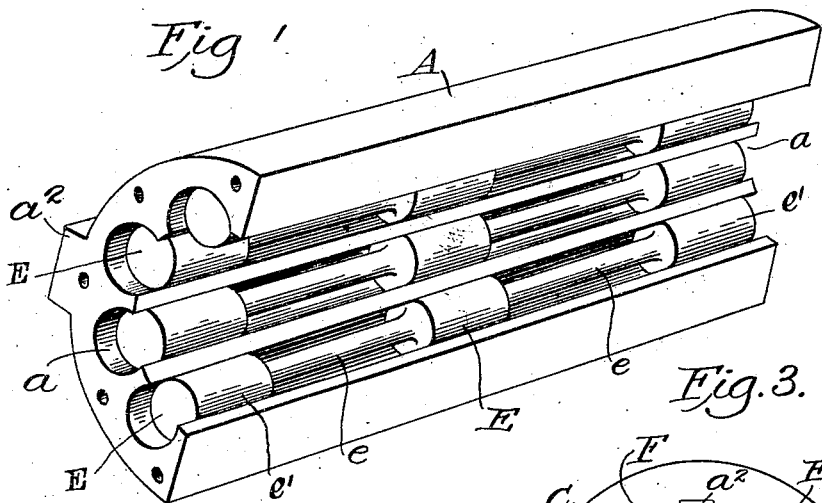
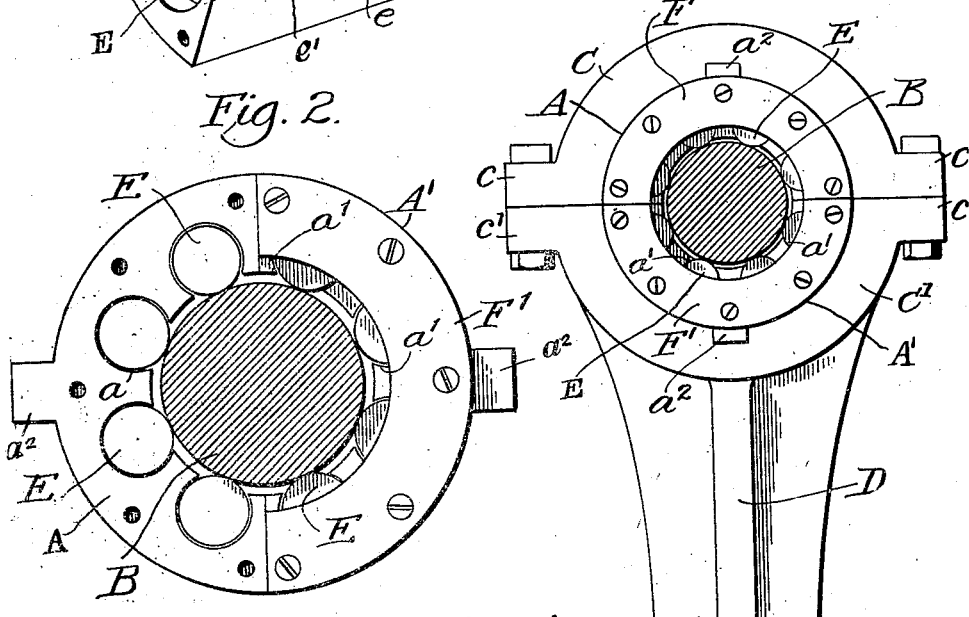
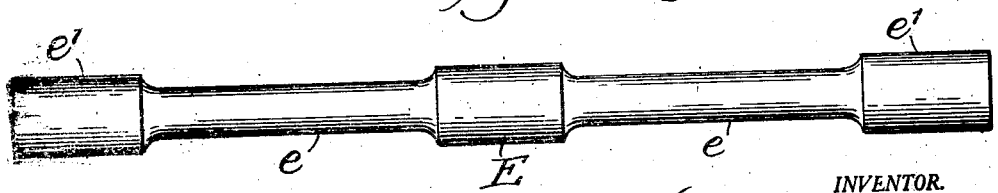
INVENTOR.
Frank O. Norris
BY
his ATTORNEY.

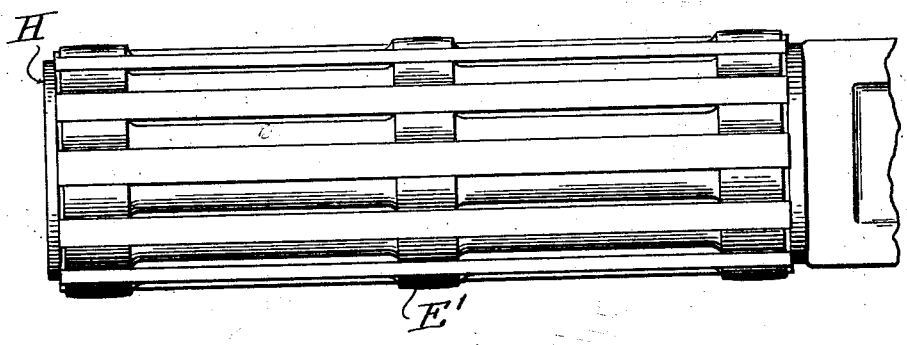
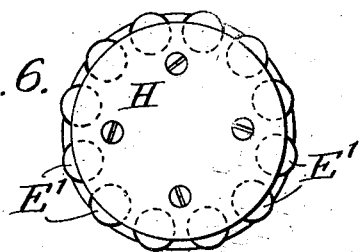
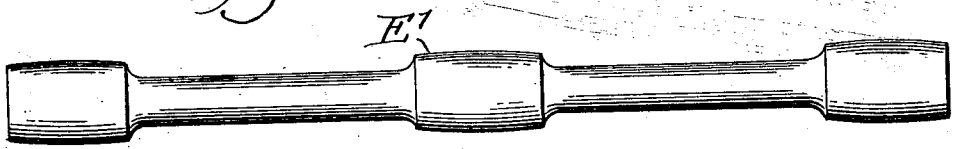

Patented Jan. 8, 1924.

1,480,293

UNITED STATES PATENT OFFICE.

FRANK O. NORRIS, OF BALTIMORE, MARYLAND.

ROLLER BEARING.

Application filed February 16, 1922. Serial No. 536,999.

*To all whom it may concern:*

Be it known that I, FRANK O. NORRIS, a citizen of the United States, residing at Baltimore, in the county of Baltimore and State of Maryland, have invented certain new and useful Improvements in Roller Bearings; and I do hereby declare the following to be a full, clear, and exact description of the invention, such as will enable others skilled in the art to which it appertains to make and use the same.

This invention relates to anti-friction bearings and more particularly to roller bearings.

The main object of the invention is to provide an antifriction roller bearing for car axles and shafts which shall possess great strength and be capable of carrying or supporting heavy loads and sustaining severe strains without liability to injury.

The invention will first be hereinafter more particularly described, with reference to the accompanying drawings, which are to be taken as a part of this specification, and then pointed out in the claims at the end of the description.

In said drawings, Fig. 1 is a perspective view of one member of a roller-retaining and separating cage forming a part of a roller bearing embodying my invention;

Fig. 2 is an end view showing the cage members of the bearing in assembled relation; one member of the retaining plate or cap on the near end of the bearing being removed;

Fig. 3 is a side elevation of a shaft hanger or standard having my improved roller bearing mounted thereon;

Fig. 4 is a plan view of one of the rollers detached;

Fig. 5 is a plan view of a modification of the invention;

Fig. 6 is an end view of said modification;

Fig. 7 is a plan view of a modified form of roller detached; and

Fig. 8 is a plan view of a plain roller that may be used instead of the forms shown in Figs. 4 and 7.

Referring to said drawings, in which the same reference characters are used to denote corresponding parts in different views, the letter A denotes one member and $A^1$ another member of a cage or housing adapted to hold in separated relation a circular series of rollers surrounding a shaft or spindle B of a car axle or the like, each of said members A and $A^1$ being substantially semi-cylindrical in form and adapted to be secured together between substantially semi-cylindrical members C and $C^1$ of an axle box or housing having apertured lugs or ears $c$ and $c^1$ to receive fastening bolts for securing the two members C and $C^1$ together and clamping the roller cage A, $A^1$, therebetween. In this instance the member $C^1$ of said axle box or housing is formed on the upper end of a shaft hanger or standard D on which the roller bearing is mounted. The cage members A and $A^1$ are each formed or provided with a spaced series of longitudinal roller receiving grooves $a$ and $a^1$, respectively, which are substantially semi-circular in form but greater than a semi-circle so as to leave a spaced series of longitudinal gaps or grooves of reduced width on the inner circumference of the cylindrical body or cage member through which the periphery of a roller E fitted in each of said grooves may project toward the center of the united cage members A and $A^1$, thus providing a circular series of spaced rolling surfaces adapted to contact with the shaft or spindle B. One or both sections or members A and $A^1$ of the cylindrical body or cage is formed or provided with a boss or projection $a^2$ adapted to engage a recess or recesses in the axle box or bearing members C and $C^1$, so as to hold the cylindrical body stationary. The rollers are inserted in the grooves or recesses $a$ and $a^1$ at one end thereof and a cap plate or plates F and $F^1$, bolted or otherwise secured to the end of the cylindrical body, prevents the rollers from escaping. The rollers are preferably formed with reduced portions $e$ connecting three, more or less, larger portions $e^1$ so as to provide oil spaces between the enlarged portions, whereby the rollers may be thoroughly lubricated, and such enlarged portions may be of the same diameter their entire length, but it may be desirable in some cases to form such enlarged portions so that they will taper slightly in opposite directions from an intermediate point, as shown in Fig. 7, so as to permit a slight rocking movement. They may however be continuous or of the same diameter from end to end, as shown in Fig. 8.

In Fig. 5 of the drawings I have shown a modification in which an axle spindle or similar body is formed with a series of longitudinal grooves or recesses in its periphery, of the same form as the grooves described with reference to Figs. 1 to 3 of the drawings, and a series of rollers $E^1$ are inserted in said recesses and secured therein by means of an annular plate or disk H bolted or otherwise secured on the outer end of the spindle. In this instance, the rollers shown have the outer surfaces of the enlarged portions thereof of larger diameter centrally and tapering in opposite directions, so as to permit a slight rocking movement or free play. Instead of rollers of the form described plain rollers may be used, such as shown in Fig. 8 of the drawings and marked $E^2$.

Having thus described my invention, what I claim as new and desire to secure by Letters-Patent of the United States is:—

1. A roller bearing comprising a non-rotating cylindrical body composed of separable substantially semi-cylindrical parts each having in its inner bearing surface a circularly spaced series of longitudinal grooves which are interiorly enlarged or widened in circular form so as to provide open fronts of reduced width, a series of independent rollers inserted endwise within said grooves and having their peripheries projecting slightly through said open fronts and adapted to anti-frictionally bear upon the entire bearing surface of the periphery of a shaft journaled therein, and removable means at one end of said body to prevent the withdrawal or endwise movement of said rollers.

2. A roller bearing member comprising opposed substantially semi-cylindrical bodies, each having in its inner bearing surface a series of spaced longitudinal grooves which are interiorly enlarged or widened in circular form so as to provide opposed curved walls and open longitudinal gaps of reduced width, a series of independent rollers inserted endwise thereof within said grooves and having peripheral portions projecting through said gaps and adapted to anti-frictionally bear upon the entire bearing surface of the journal of a shaft, together with means to prevent the withdrawal or endwise movement of said rollers.

3. The combination in a roller bearing, of substantially semi-cylindrical separable bearing members having confined therebetween substantially semi-cylindrical separable roller retaining and separating members having in their inner bearing surfaces a series of spaced longitudinal grooves which are interiorly enlarged or widened in circular form so as to provide opposed curved walls and open longitudinal gaps of reduced width, a spaced series of rollers constructed with intermediate portions of reduced sizes connecting larger portions at the ends and at an intermediate point or points inserted endwise within said grooves with peripheral portions thereof projecting through the open sides of the grooves forming an encircling anti-friction bearing about the journal of a shaft, and end plates secured to said roller retaining members to prevent outward endwise movement of the rollers.

In testimony whereof I affix my signature in the presence of two witnesses.

FRANK O. NORRIS.

Witnesses:
ANNA SAUNDERS,
J. W. GIBBONS.